Patented Oct. 23, 1934

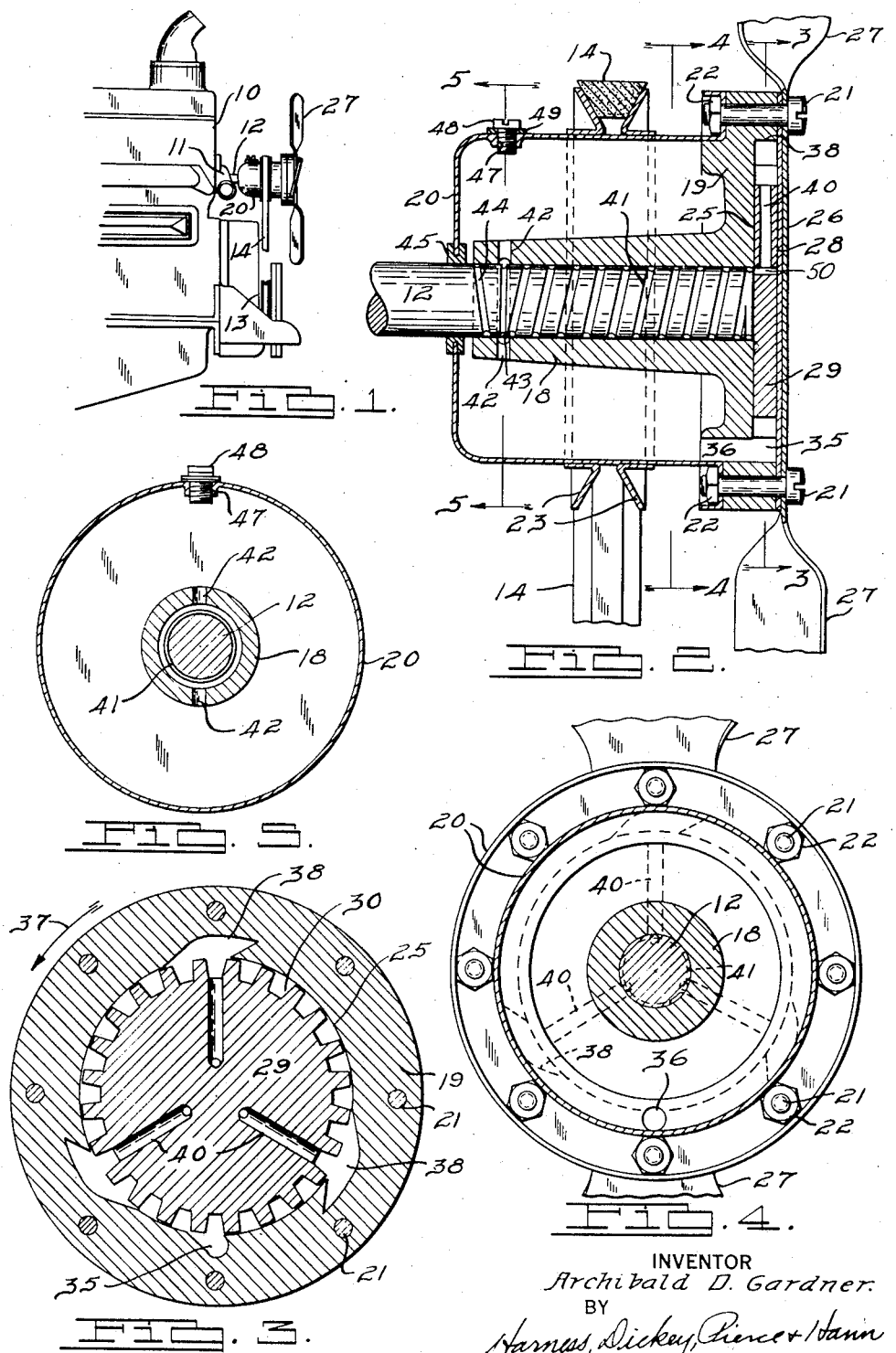

1,977,942

UNITED STATES PATENT OFFICE 1,977,942

FAN CONSTRUCTION

Archibald D. Gardner, Jackson, Mich.

Application January 30, 1930, Serial No. 424,537
Renewed March 12, 1934

7 Claims. (Cl. 308—117)

This invention relates to certain improvements in fans and particularly the fans of the type employed in connection with the cooling systems of internal combustion engines.

The object of the invention is to construct a fan, either of the plain bearing or anti-friction bearing type, that is effectively lubricated by a contained lubricating system, the circulation of the lubricant through which is maintained by the operation of the fan by reason of a self-contained pump unit.

Other objects and advantages relate to the details of construction and form of the various parts, all as will more fully appear from the following description taken in connection with the accompanying drawing, in which Fig. 1 is a fragmentary side elevation of the forward parts of an internal combustion engine showing a fan mounted thereon.

Fig. 2 is an enlarged vertical sectional view taken through the axis of the fan shown in Fig. 1.

Fig. 3 is a sectional view taken on the line 3—3 of Fig. 2.

Fig. 4 is a sectional view taken on the line 4—4 of Fig. 2.

Fig. 5 is a sectional view taken on the line 5—5 of Fig. 2.

Fans of the type disclosed herein are conventionally employed in connection with the engines of motor vehicles for the purpose of insuring the circulation of air through the radiator thereof. Such an engine is indicated at 10 in Fig. 1. In such constructions it is conventional practice to provide on or adjacent the front end of the engine a bracket such as 11 in which a forwardly extending shaft such as 12 is secured. The fan is rotatably mounted upon the shaft 12 and is driven from a pulley such as 13 secured to the crank-shaft (not shown) of the engine through a belt such as 14. The bracket 11 may be such as to permit the shaft 12 to be bodily shifted towards or away from the pulley 13 in order to adjust the tension of the belt 14, or other means for adjusting the tension of the belt may be employed where found necessary or desirable.

In accordance with the present invention upon the shaft 12 is rotatably mounted the hub 18 of the fan, this hub 18 is being peripherally enlarged at the forward end as at 19 for a purpose to be hereinafter described. A cup-shaped shell 20 preferably of sheet metal is positioned over the shaft 12 and the hub 18 in concentric relation therewith and its open end is bolted to the flange 19 by means of bolts 21 and nuts 22, and is therefore closed thereby. The cup member 20 may be peripherally provided with opposed flange members 23 which co-operate to form a pulley in which the belt 14 is received.

The forward face of the hub 18 and flange 19 is recessed as at 25 and this recess is closed by the central or hub portion 26 of the fan blade unit or spider which includes the fan blades 27, this spider being secured in place by the same bolts 21 which secure the cup 20 to the flange 19. In accordance with one phase of the present invention I provide between the hub portion 26 of the fan blade assembly and the flange 19 a fiber or other sheet like member 28, the purpose of which, in addition to its normal purpose as a gasket, will later be pointed out.

The shaft 12 projects into the recess 25 and is there provided with a radial enlargement 29 of disc-like form, the periphery of which extends into close but preferably slightly spaced relationship with respect to the outer edges of the circular recess 25. The thickness of the portion 29 is preferably of slightly smaller dimension than the depth of the recess 25 so that the fan assembly may turn freely upon the shaft 12, yet is held against appreciable axial movement thereon. While the periphery of the disc portion 29 may be left substantially smooth, I prefer, in accordance with the present invention, to form in the same preferably axially extending recesses or notches such as 30, of almost any shape, to serve as pockets for lubricant as will hereinafter be explained.

At one or more points in the periphery of the recess 25 I provide a pocket such as 35 (see Fig. 3) which is connected by a passage such as 36 (see Fig. 2) with the interior of the cup 20 at a point immediately adjacent the inner periphery thereof. The walls of the pocket 35 preferably extend approximately tangentially towards the periphery of the disc 29 in a direction opposite to the direction of rotation of the fan on the shaft 12 as indicated by the arrow 37 in Fig. 3. At one or more other points around the periphery of the recess 25 and circumferentially spaced from the pocket 35 I provide a pocket 38, the walls of which extend in a generally tangential direction with respect to the disc 29, and in the same direction of rotation as the fan, as is best illustrated in Fig. 3. These pockets 38 unlike the pocket 35 are not connected with the interior of the cup 20.

In accordance with the present invention I further provide one or more radial passages such as 40 in the disc 29 and, where notches 30 are provided in the periphery of the disc 29, from the bottom of one of the notches 30 to a point adjacent the surface of the shaft 12. The surface of the shaft 12, or in some cases the bore of the hub 18, is provided with a spiral groove 41 therein which communicates with the passages 40 and extends from the disc 29 to a point adjacent the left-hand end of the hub 18 as indicated in Fig. 2, and at which point the hub 18 is provided with one or more radial openings such as 42, and the surface of the shaft or the inner surface of the hub, as the case may be, is provided with an annular groove 43. The grooves 41 are either right or left hand dependent upon the direction of rotation of the fan, so that lubricant finding its way to the shaft 12 adjacent the right hand thereof as viewed in Fig. 2, will be acted upon by the wiping action of the hub on the lubricant in the groove to aid in carrying the lubricant to the rear or to the left as viewed in Fig. 2. To the left of the openings 42 in the hub 18 similar grooves 44 are provided in the surface of the shaft, the direction of turn of these grooves being opposite to that of the grooves 41 so as to exert a tendency to cause any oil that finds its way to the shaft 12 to the left of the opnings 42, as viewed in Fig. 2, to be carried to the right to the annular groove 43, where such oil will mingle with the oil carried to the left by the grooves 41 and will be discharged radially outward through the openings 42 in the hub 18 into the cup 20. Any suitable type of packing means such as 45 may be employed between the closed end of the cup and the shaft 12 in order to further eliminate possibility of leakage of oil out of the cup 20 around the shaft 12.

In operation the interior of the cup 20, which serves as a lubricant reservoir or chamber, is filled with lubricant to a point below the lower surface of the shaft 12. Such lubricant may be introduced into the cup 20 through an opening such as 47 normally closed by a screw plug such as 48 and provided with a conventional gasket such as 49. Upon rotation of the fan in the direction indicated by the arrow in Fig. 3, the oil within the cup 20 will be thrown outwardly against the sides of the cup by centrifugal force and will tend to flow through the passage 36 into the pocket 35. From the pocket 35 the lubricant will be fed to the periphery of the disc 29 where it will fill the various notches 30. The flange 19 and hub 18 in rotating about the shaft 12 will cause the various pockets 38 to be swept over the periphery of the disc 29, and because of the sharp trailing edges of the pockets 38, any excess oil in the notches 30 will be sheared off of the surface of the disc 29 and become deposited in the pockets 38. For this reason, a supply of oil under pressure will be built up in each of the pockets 38 and this pressure will be such that as each pocket 38 becomes aligned with one of the passages 40 the oil from the pocket 38 will be forced through the passage 40 to the surface of the shaft 12 and into the groove 41 where, due to this pressure and due to rotation of the hub 18 in relation to the groove 41, it will be carried towards the rear end of the shaft 12 and eventually will be thrown out into the interior of the cup 20 through the passages 42. Thus a continuous circulation of oil is provided for the bearing surfaces between the shaft 12 and the hub 18.

Although it may be unnecessary in some cases, I prefer to extend the opening or openings 50 or other passages employed to groove 41 with the passages 40, to the front face of the disc 29 so that lubricant may be fed between the front face of the disc 29 and the plate 28 in order to properly lubricate such surfaces, it being understood that these surfaces contact at times, at which times the plate 28 serves as a wear plate. Part of the lubricant being fed through the passage 50 to the groove 41 will, of course, find its way between the back face of the recess 25 and the rear face of the disc 29, where the normal thrust of the fan is exerted, and serve to lubricate such surfaces.

It is to be noted that in this construction, unlike many constructions that have been placed upon the market, it is not the impact between the lubricant and the periphery of the disc 29 which is depended upon for forcing the oil to the shaft bearings, but instead in the present case the pockets 38 are provided in which the oil is first placed under pressure and is then transmitted by such pressure to the wearing surface of the shaft. While I have shown the passages 40 centrally disposed within the disc 29, it is obvious that their function will not change if they are formed as grooves in the side of the disc 29 instead of a completely laterally closed opening as shown, but I prefer to form them centrally as shown in order to prevent possible interference of its free flow because of the viscosity of the oil exposed to the rotating surface of the recess 25 and from any centrifugal effect that such rotating surface might have thereon. It will also be apparent that the openings 40 need not necessarily be disposed in a true radial direction as shown but may vary in different manners as thought desirable or necessary.

It is also obvious that the device is operable equally well if the hub portion is held against rotation and the shaft caused to turn, with such structural modifications necessary in such change, all that is necessary in either case being a relative movement between these parts.

These and other formal changes may be made in the specific embodiment of the invention described without departing from the spirit and substance of the broad invention, the scope of which is commensurate with the appended claims.

What is claimed is,

1. In a fan construction, the combination of an elongated hub having a radially extending flange at one end thereof, means providing a lubricant chamber at one side of said flange, the opposite side of said flange having a circular recess therein, said flange having a passageway leading to a pocket formed therein and extending outwardly from said recess and providing communication between said lubricant chamber and said recess, the peripheral wall of said recess having a second and lubricant collecting pocket therein not in direct communication with said lubricant chamber, said second pocket being inclined rearwardly with respect to the direction of rotation of said hub, and a head in said recess relatively rotatable with respect to said hub for transferring lubricant from one of said pockets to the other thereof.

2. In a device of the type described, in combination, a shaft, a hub thereon rotatable relatively thereto, a peripherally extending flange on said hub provided with a recess in an end face thereof, a head on said shaft rotatably fitting within said recess, a member closing the open end of said recess, and a member surrounding a portion of said hub forming a lubricant reservoir, said flange being formed to provide a pair of pockets in the periphery of said recess extending outwardly relative to the center thereof, one of said pockets being in open communication with the interior of said member adjacent the periphery thereof, the other of said pockets being free of open communication with said reservoir, and said head being provided with a passage connecting the periphery thereof with the surface of said shaft.

3. In a device of the type described, in combination, a shaft, a hub thereon rotatable relatively thereto, a peripherally extending flange on said hub provided with a recess in an end face thereof, a head on said shaft rotatably fitting within said recess, said head being formed to provide a plurality of lubricant receiving notches in the periphery thereof, a member closing the open end of said recess, and a member surrounding a portion of said hub forming a lubricant reservoir, said flange being formed to provide a pair of pockets in the periphery of said recess extending outwardly relative to the center thereof, one of said pockets being in open communication with the interior of said member adjacent the periphery thereof, the other of said pockets being free of open communication with said reservoir, and said head being provided with a passage connecting one of the notches in the periphery thereof with the surface of said shaft.

4. In a device of the type described, in combination, a shaft, a hub thereon rotatable relative thereto, a peripherally extending flange on said hub provided with a recess in an end face thereof, a head on said shaft rotatably fitting within said recess, said head being formed to provide a plurality of lubricant receiving notches in the periphery thereof, a member closing the open end of said recess, and a member surrounding a portion of said hub forming a lubricant reservoir, said flange being formed to provide a pair of pockets in the peripheral wall of said recesses, one of said pockets extending in an approximately tangential direction with respect to said head and opening into said recess in a direction generally opposite to the direction of rotation of said hub, the last mentioned pocket being in communication with the interior of said surrounding member adjacent the periphery thereof, and said head being provided with a passage connecting its periphery with the bearing between said shaft and said hub whereby to conduct oil from the first mentioned pocket to said bearing when said passage becomes aligned with said first mentioned pocket.

5. In a device of the type described, in combination, a shaft, a hub thereon rotatable relative thereto, a peripherally extending flange on said hub provided with a recess in an end face thereof, a head on said shaft rotatably fitting within said recess, said head being formed to provide a plurality of lubricant receiving notches in the periphery thereof, a member closing the open end of said recess, and a member surrounding a portion of said hub forming a lubricant reservoir, said flange being formed to provide a pair of pockets in the peripheral wall of said recess, one of said pockets extending in an approximately tangential direction with respect to said head and opening into said recess in the general direction of rotation of said hub, the trailing wall edge of said pocket being sharp, the other of said pockets being in communication with the interior of said member adjacent the periphery thereof, and said head being provided with a passage connecting its periphery with the bearing between said shaft and said hub whereby to conduct oil from the first mentioned pocket to said bearing when said passage becomes aligned with said first mentioned pocket.

6. In a device of the type described, in combination, a shaft, a hub thereon rotatable relative thereto, a peripherally extending flange on said hub provided with a recess in an end face thereof, a head on said shaft rotatably fitting within said recess, said head being formed to provide a plurality of lubricant receiving notches in the periphery thereof, a member closing the open end of said recess, and a member surrounding a portion of said hub forming a lubricant reservoir, said flange being formed to provide a pair of pockets in the peripheral wall of said recess, one of said pockets extending in an approximately tangential direction with respect to said head and opening into said recess in the general direction of relative rotation of said hub, and the other of said pockets extending in an approximately tangential direction with respect to said head and opening into said recess in a direction generally opposite to the direction of relative rotation of said hub, the trailing wall edge of the first of said pockets being sharp and the leading wall edge of said other of said pockets being sharp, said other pocket being in communication with the interior of said member adjacent the periphery thereof, and said head being provided with a passage connecting its periphery with the bearing between said shaft and said hub whereby to conduct oil from the first mentioned pocket to said bearing when said passage becomes aligned with said first mentioned pocket.

7. In a fan construction, the combination of an elongated hub having a radially extending flange at one end thereof, means providing a lubricant chamber at one side of said flange, the opposite side of said flange having a circular recess therein, said flange having a passageway providing communication between said hub chamber and said recess, a shaft extending through and relatively rotatable with respect to said hub, a head on said shaft fitting within said recess, the peripheral wall of said recess having a lubricant collecting pocket therein for receiving lubricant from the periphery of said head, said pocket being free from open communication with said lubricant chamber, said head having a radially extending passageway therein providing communication between its outer periphery and the bearing surface of said shaft, and a plate secured to said hub flange for covering said recess and shaft head.

ARCHIBALD D. GARDNER.